United States Patent
Kim et al.

(10) Patent No.: US 7,684,295 B2
(45) Date of Patent: Mar. 23, 2010

(54) RECORDING MEDIUM, METHOD OF RECORDING CONTROL INFORMATION ON A RECORDING MEDIUM, METHOD OF RECORDING/REPRODUCING DATA USING CONTROL INFORMATION, AND APPARATUS FOR RECORDING/REPRODUCING DATA USING CONTROL INFORMATION

(75) Inventors: Jin Yong Kim, Seongnam-si (KR); Sang Woon Suh, Seoul (KR)

(73) Assignee: LG Electronics, Inc., Seoul (KR)

( * ) Notice: Subject to any disclaimer, the term of this patent is extended or adjusted under 35 U.S.C. 154(b) by 1597 days.

(21) Appl. No.: 10/883,845

(22) Filed: Jul. 6, 2004

(65) Prior Publication Data

US 2005/0007913 A1 Jan. 13, 2005

(30) Foreign Application Priority Data

Jul. 8, 2003 (KR) ............... 10-2003-0046148
Jul. 9, 2003 (KR) ............... 10-2003-0046420
Sep. 9, 2003 (KR) ............... 10-2003-0063271

(51) Int. Cl.
G11B 15/00 (2006.01)
(52) U.S. Cl. .................... 369/47.39; 369/94
(58) Field of Classification Search .................. None
See application file for complete search history.

(56) References Cited

U.S. PATENT DOCUMENTS

2002/0048646 A1 4/2002 Tomura et al.
2005/0030853 A1* 2/2005 Lee et al. ................ 369/47.22
2006/0140097 A1* 6/2006 Tasaka et al. ............ 369/59.11

FOREIGN PATENT DOCUMENTS

CN 1151071 A 6/1997
EP 0 968 769 A2 1/2000
EP 1 172 810 A2 1/2002

OTHER PUBLICATIONS

International Search Report issued Sep. 10, 2004 in corresponding International Patent Application No. PCT/KR2004/001639.

* cited by examiner

*Primary Examiner*—Paul Huber
(74) *Attorney, Agent, or Firm*—Harness, Dickey & Pierce, P.L.C.

(57) ABSTRACT

The present invention provides a method of recording disc control information in a recordable optical disc including at least one recording layer, and more particularly, a method of recording information indicating a specific location of disc control information within the disc control information itself and a method of searching requested disc control information, thereby enabling to uniformly apply the standardized disc control information to efficiently cope with the record/playback of the optical disc and to efficiently search a plurality of disc informations. In recording disc control information within a management area of an optical disc including at least one or more recording layers, the present invention includes providing at least one or more disc control informations to the management area wherein the at least one or more disc control informations are separately provided per applicable recording layer and per applicable writing speed and wherein an information designating a location of $1^{st}$ disc control information per the applicable writing speed is separated from an information designating a location of disc information of the applicable recording layer to be recorded within the disc control information.

19 Claims, 14 Drawing Sheets

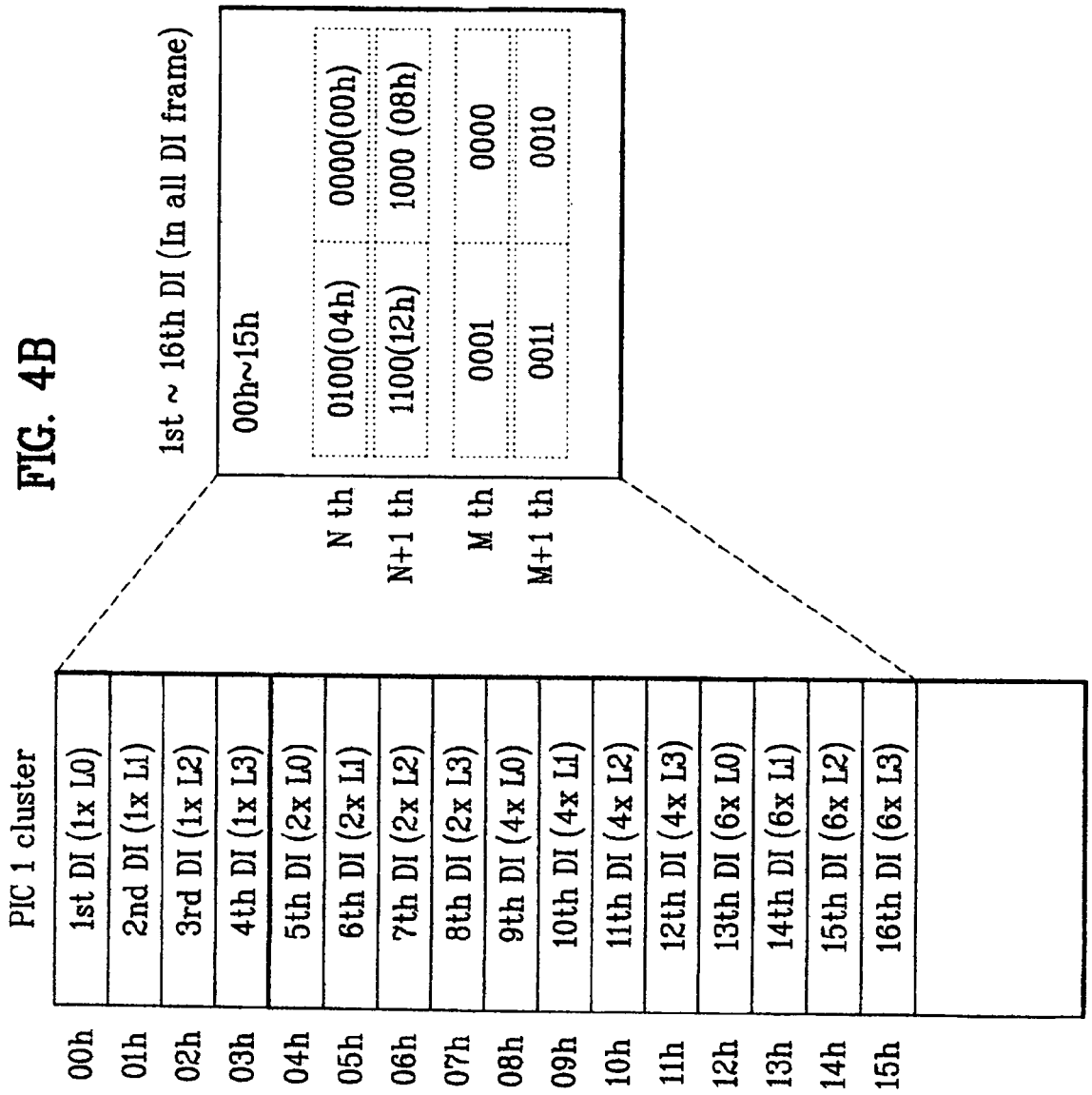

FIG. 4C

| PIC 1 cluster | |
|---|---|
| 00h | 1st DI (1x L0) |
| 01h | 2nd DI (1x L1) |
| 02h | 3rd DI (2x L0) |
| 03h | 4th DI (2x L1) |
| 04h | 5th DI (4x L0) |
| 05h | 6th DI (4x L1) |
| 06h | 7th DI (6x L0) |
| 07h | 8th DI (6x L1) |

1st ~ 8th DI (In all DI frame)

| | 00h~07h | |
|---|---|---|
| N th | 0010 (02h) | 0000 (00h) |
| N+1 th | 0110 (07h) | 0100 (04h) |
| M th | 0001 | 0000 |
| M+1 th | 1111 (None) | 1111 (None) |

FIG. 7B

| | PIC 1 cluster |
|---|---|
| 00h | 1st DI (L0 1x) |
| 01h | 2nd DI (L0 2x) |
| 02h | 3rd DI (L0 4x) |
| 03h | 4th DI (L0 8x) |
| 04h | 5th DI (L1 1x) |
| 05h | 6th DI (L1 2x) |
| 06h | 7th DI (L1 4x) |
| 07h | 8th DI (L1 8x) |

1st ~ 8th DI (In all DI frame)

00h~07h

| | N th | 0100 (01h) | 0000 (00h) |
|---|---|---|---|
| | N+1 th | 0000 (03h) | 0000 (02h) |
| | M th | 0101 (05h) | 0100 (04h) |
| | M+1 th | 0111 (07h) | 0110 (06h) |

RECORDING MEDIUM, METHOD OF RECORDING CONTROL INFORMATION ON A RECORDING MEDIUM, METHOD OF RECORDING/REPRODUCING DATA USING CONTROL INFORMATION, AND APPARATUS FOR RECORDING/REPRODUCING DATA USING CONTROL INFORMATION

This application claims the benefit of the Korean Application No. 10-2003-0046148 filed on Jul. 8, 2003 and No. 10-2003-0046420 filed on Jul. 9, 2003 and No. 10-2003-0063271 filed on Sep. 9, 2003, which are hereby incorporated by reference.

BACKGROUND OF THE INVENTION

1. Field of the Invention

The present invention relates to a recording medium, such as optical disc, and a method of recording disc control information in a recordable optical disc including at least one recording layer, and more particularly, to a method of recording information indicating a specific location of disc control information within the disc control information itself, to a method of searching requested disc control information, and to method of recording data using the disc control information recorded in a specific area of the recordable optical disc.

2. Discussion of the Related Art

A high density optical recording medium, known as HD-DVD, is widely used to record and store high definition video data, large amounts of program data, and high quality audio data. The Blu-ray disc represents next-generation HD-DVD technology. Technological specifications are now being established for the global standardization of the Blu-ray disc, including standards for a write-once Blu-ray disc (BD-WO). Meanwhile, a rewritable Blu-ray disc, known as 1× speed BD-RE are now under discussion, should be compatible with BD-RE discs expected to have higher writing speeds, i.e., 2× speed BD-RE and beyond. BD-WO specifications for high writing speeds are also in development. Efficient solutions for coping with the high writing speed of a high-density optical disc are urgently needed, and the specifications established should promote mutual compatibility.

SUMMARY OF THE INVENTION

Accordingly, the present invention is directed to an disc control information recording method that substantially obviates one or more problems due to limitations and disadvantages of the related art.

An object of the present invention is to provide a method of recording disc control information as specified information coping with high writing speed, by which writing speed information is included in the disc control information so that the recorded disc control information is efficiently searched.

Another object of the present invention is to provide a method of providing disc control information coping with high writing speed in a specific area within a disc, by which reciprocal compatibility between the same based discs is provided.

Another object of the present invention is to provide a method of searching disc control information, by which contents of the requested disc control information associated with a specific writing speed when real data is written/played back on/from an optical disc using the recorded disc control information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording a control information of recording medium according to the present invention includes the step of generating a control information, the control information including at least one or more information unit associated with a specific writing speed and recording layer, wherein an information unit including a first pointer designating a location of information unit of an applicable writing speed and/or a second pointer designating a location of information of an applicable recording layer, and recording the at least one or more information units in a specific area of the recording medium.

In another aspect of the present invention, a method of recording disc control information on a recording medium includes the step of generating a control information, the control information including at least one information unit including a write strategy for a specific writing speed, a specific recording layer, a pointer information indicating an information unit associated with a specific writing speed and a specific recording layer, and recording the control information in a specific area of the recording medium.

In another aspect of the present invention, a data structure for a control information recorded on a recording medium including at least on recording layer or to be recorded/reproduced on/from the recording medium, characterized in that the control information comprising at least one or more information units, which are located at a specific area of the recording medium, each information unit comprises a location pointer identifying a sequence number thereof according to a specific writing speed and recording layer.

In another aspect of the present invention, a recording medium including at least one recording layer provided with a recordable area and a prerecorded area, characterized in that information unit is provided per an applicable recording layer and writing speed within the prerecorded area, wherein an information unit includes a first pointer designating a location of first information unit per the applicable writing speed and second pointer designating a location of information unit of the applicable recording layer.

In another aspect of the present invention, an optical disc includes at least one or more recording layers wherein an area for recording at least one or more disc control informations per applicable recording layer and writing speed is provided within a management area of the optical disc, wherein a common pointer information is recorded within each of the at least one or more disc control informations, and wherein the common pointer information enables the at least one or more disc control informations to have a same value.

In another aspect of the present invention, a method of recording data on an optical disc includes the steps of checking a location of an disc information for a requested writing speed, based on a pointer information, wherein the pointer information including first pointer designating a location of first disc information per applicable writing speed, and recording data on a specific area of the recording medium based on at least the disc information designated by the first pointer.

In another aspect of the present invention, an optical disc recording/reproducing apparatus includes an optical pickup reading a plurality of disc control informations separately written per recording layer and per writing speed within a management area of an optical disc, each disc control information include a location information to designate a location of the disc control information associated with a specific writing speed of a specific recording layer and a controller checking the location of the disc control information associated with the specific recording layer and the specific writing speed from the location information read from the optical pickup, and performing a recording using write strategy parameters included within the checked disc control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4C are diagrams of disc information recorded according to a first embodiment of the present invention;

FIG. 7A and FIG. 7B are diagrams of disc information recorded according to a fourth embodiment of present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM, DVD-RW, DVD+RW, DVD-R, DVD+R and the like for example in the same manner.

Although terminology used herein is well known for the most part, some terms have been chosen by the applicant, such that the present invention should be understood with the intended meanings of the terminology as used by the applicant. For example, the 'disc control information' of a disc is recorded in a specified area, i.e., a recordable area of the disc or (sometimes known as an embossed area, in which manufacturer data is recorded and where no further recording is possible), and includes information necessary for the playback of a recorded disc. Disc control information is called "disc information" or "DI" in relation to Blu-ray disc technology but is typically referred to as 'physical format information' in DVD-RAM, DVD-RW, DVD+RW, DVD-R, and DvD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
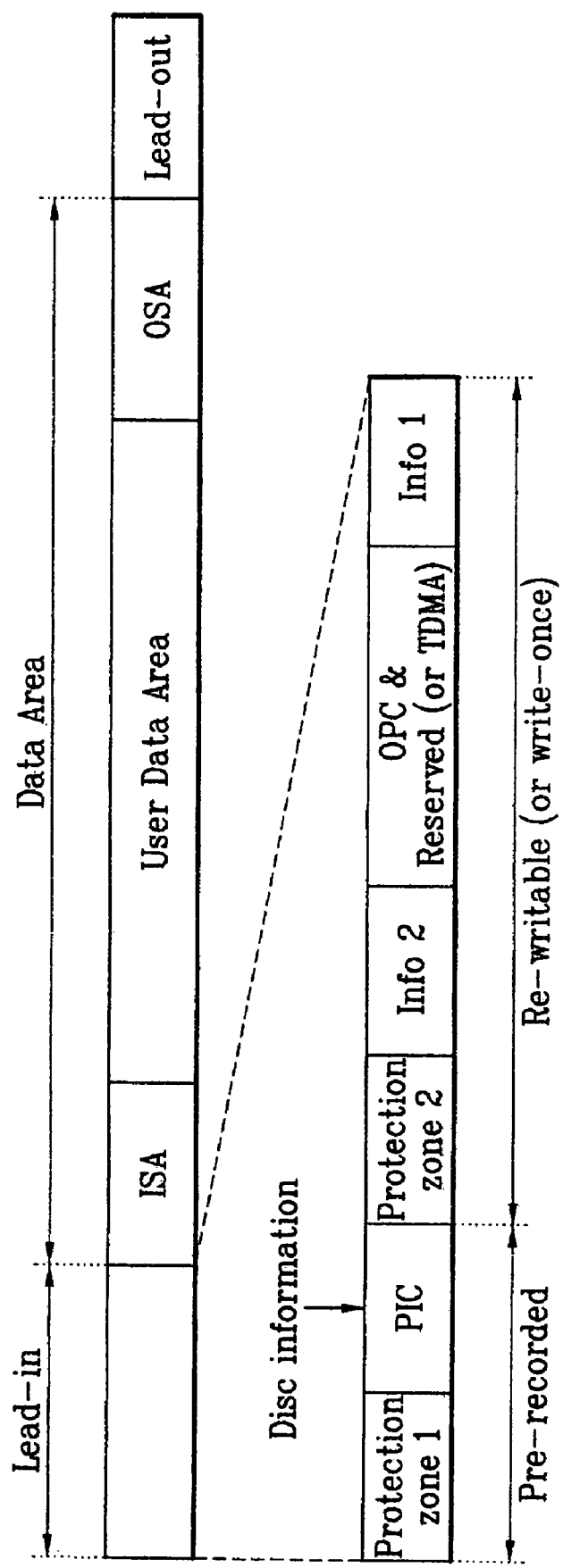
FIG. 1 is a diagram of a single-layer disc applicable to the present invention.
Figure 2:
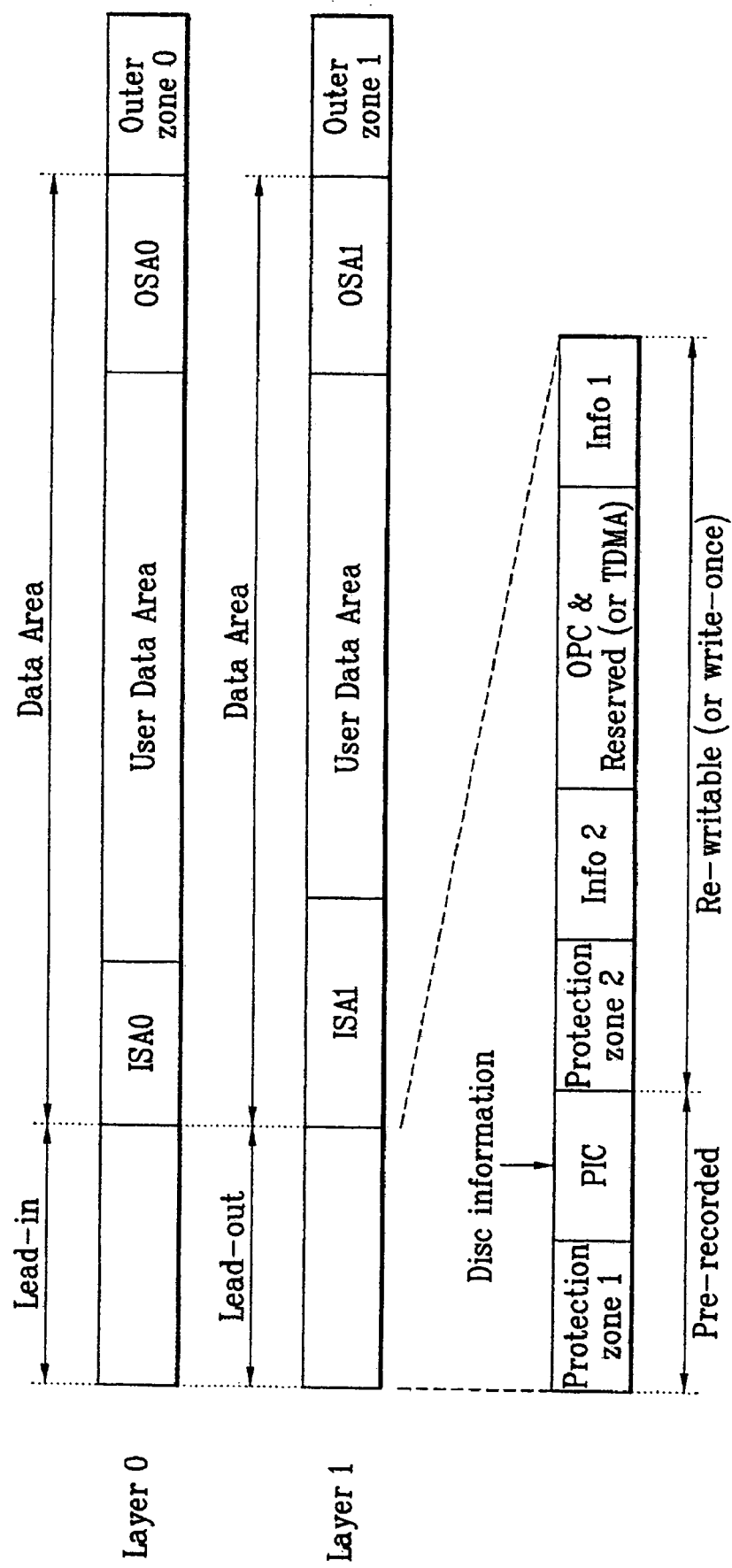
FIG. 2 is a diagram of a dual-layer disc applicable to the present invention.

FIGS. 1 and 2 are illustrates the structure of optical discs according to the present invention, in which any recordable optical disc may applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumstance area, a pre-recorded area and a rewritable or write-once area are provided separately.

In BD-RE and BD-WO technology, the pre-recorded area is called PIC area, where permanent information and control data is recorded, and disc information is recorded in the PIC area.

A data area is made up of a user data area where user data is recorded and inner and outer spare areas ISA and OSA, which are used in the replacement of the data of a defect area. In the case of a BD-WO disc temporary defect management area (TDMA) is provided for recording information of a defect and for general management. The TDMA is unnecessary in case of BD-RE discs, which have a corresponding area designated as reserved.

The present invention intends to provide a method of recording disc information (DI) as disc control information required for recording and/or reproducing of a disc in a pre-recorded or recordable area. It is apparent that a method of recording DI in the pre-recorded area is differently applied to each kind of disc. In case of BD-RE and BD-WO discs, for example, the prerecorded area is PIC area and DI is recorded using bi-phased high frequency modulated signal reproduced according to a specific playback method to acquire the disc information.

FIG. 2 illustrates an optical disc having dual recording layers, in which an inner circumference area of the disc has a lead-in of a first recording layer (Layer0) corresponding to a lead-out of a second recording layer (Layer1).

In this case, one PIC area is provided in each of lead-in and lead-out areas, and the same disc information (DI) is recorded in each PIC area.

Figure 3:
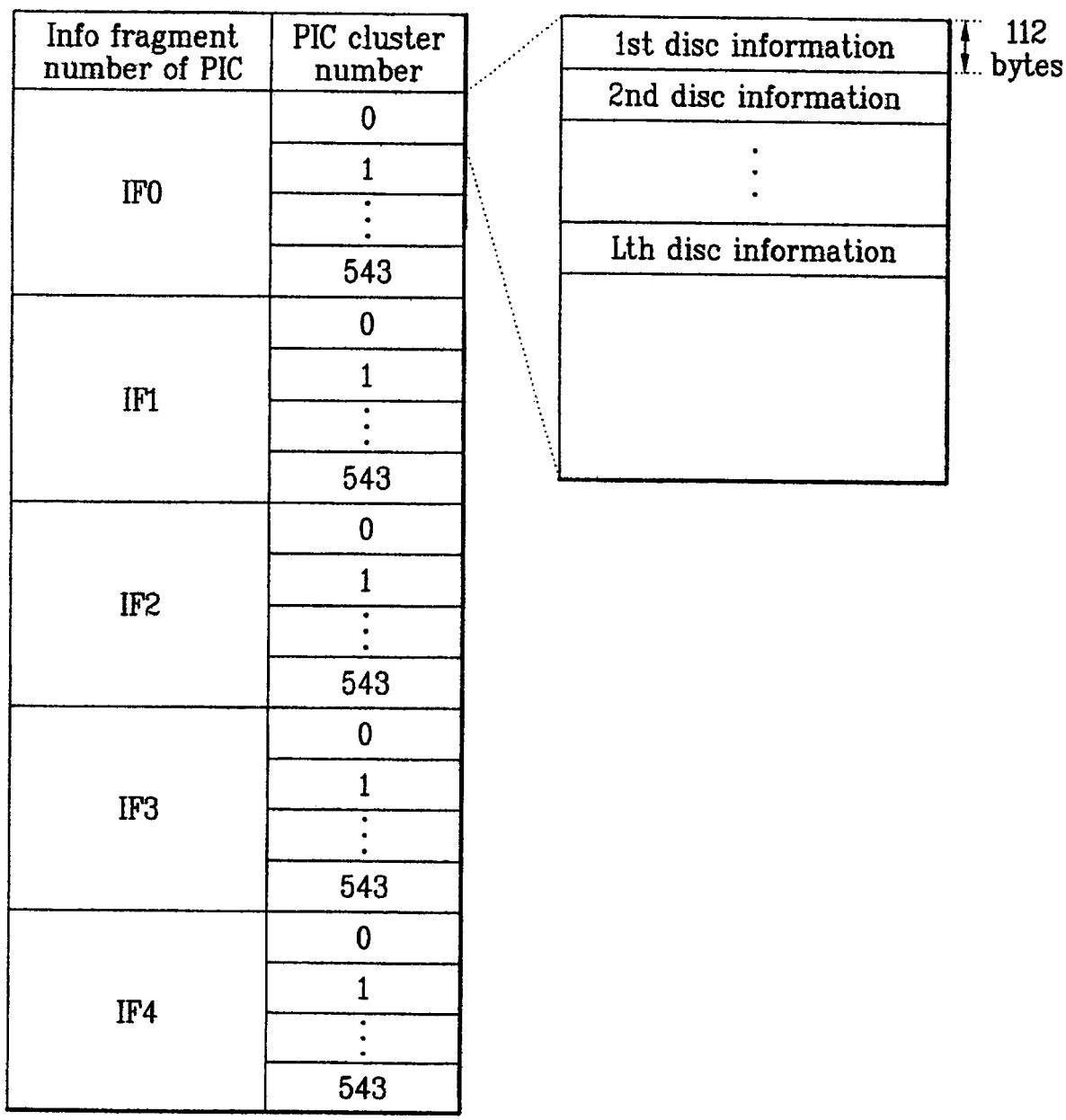
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information (DI) of the PIC area of a BD-RE or BD-WO disc, a minimum record unit is one cluster, 544 clusters constitute one fragment as one upper record unit, and 5 fragments make up the PIC area. Disc information is recorded in a front head cluster of a first fragment IF0. The disc information is plurally recorded per recording layer and writing speed permitted by the corresponding optical disc. One disc information includes 112 bytes, sometimes referred to as a disc information (DI) frame. Moreover, to cope with loss of the disc information, the same contents of the disc information are repeatedly recorded in each front head cluster of the remainder of the fragments.

Information representing the corresponding recording layer, information representing writing speed, and write strategy information corresponding to the writing speed are included in each disc information. Such information is utilized in recording and reproducing the optical disc, to provide optimal write power per recording layer and per writing speed.

In order to acquire a disc information associated with a specific speed of a specific recording layer from a plurality of disc informations, a location information, which may be called 'DI frame pointer', of each of the disc informations needs to be recorded. For instance, if there are four recording layers and four applicable writing speeds per recording layer, at least sixteen disc informations are required causing inconvenience in that a system has to search the entire disc informations whenever a value of a specific disc information is needed. Hence, the location information of the corresponding disc information (DI frame pointer) enables to overcome such an inconvenience.

Various embodiments for a method of configuring disc information and a method of recording specific information according to the present invention are explained in detail by referring to FIGS. 4A to 8 as follows.

Figure 4A:
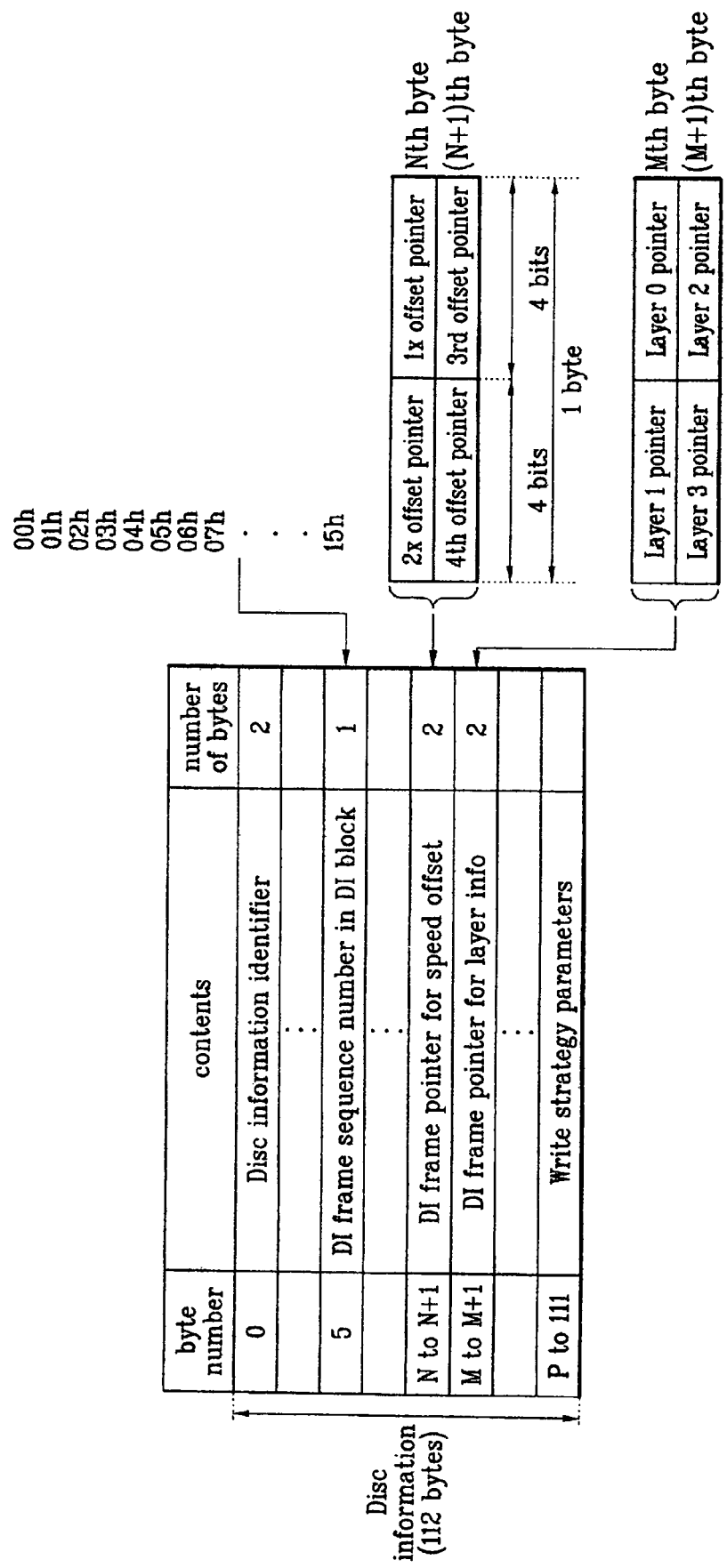

FIGS. 4A to 4C are diagrams of disc information recorded according to a first embodiment of the present invention.

FIG. 4A shows a structure of disc information for explaining a first embodiment of the present invention.

Referring to FIG. 4A, a sequence for disc information each is decided by a sequence number and is recorded in 1-byte units. For instance, the information recorded in the $5^{th}$ byte (or byte number 5) within disc information is named 'DI frame sequence number in DI block', and is briefly represented by '00h, 01h, 02h, ...'. Namely, if the information of the $5^{th}$ byte is '00h', it means $1^{st}$ disc information. If the information of the $5^{th}$ byte is '15h', it means $16^{th}$ disc information. In order to record a location information of a specific disc information, the present invention is characterized in that the DI frame pointer is decided by a combination of information designating a location of $1^{st}$ disc information per writing speed (per speed offset pointers written in $N^{th}$ and $(N+1)^{th}$ bytes) and information designating a location of disc information associated with a recording layer having each writing speed applied thereto (Layer 0, 1, 2, and 3 pointers written in $M^{th}$ and $(M+1)^{th}$ bytes). In this case, the informations are recorded in separate areas, respectively.

The present invention is also characterized in that the information designating the location of the $1^{st}$ disc information per writing speed as $5^{th}$ byte information among the disc informations is recorded by the same expression of information representing the sequence of the corresponding disc information in the form of a sequence of the corresponding disc information (ex., '00h', '03h', etc.) and that the information designating the location of the disc information associated with the recording layer having each writing speed applied thereto designates a number (offset) added in $1^{st}$ location information per the corresponding writing speed.

Moreover, the applicable writing speed in the first embodiment of the present invention shown in FIG. 4A is represented by 1× speed (1×), 2× speed (2×), $3^{rd}$ speed ($3^{rd}$ X), or $4^{th}$ speed ($4^{th}$ X). For instance, the $3^{rd}$ speed ($3^{rd}$ X) and the $4^{th}$ speed ($4^{th}$ X) can be defined to designate 4× speed and 6× speed, respectively.

Referring to FIG. 4A, a specific byte ($N^{th}$ or $(N+1)^{th}$ byte) is divided into 4-bit segments. And, a location of $1^{st}$ disc information per applicable writing speed is written in each 4-bit segment. The location of the $1^{st}$ disc information per applicable writing speed is equal to the information of the sequence of the disc information recorded in the $5^{th}$ byte. Since 2-bytes ($N^{th}$ and $(N+1)^{th}$ bytes) are allocated, it is able to represent total four writing speeds. If there exist five or more different writing speeds, more bytes such as like $N^{th}$ byte, $(N+1)^{th}$ byte, $(N+2)^{th}$ byte, and the like are added thereto. In this regard, another method of extending bytes is explained later in detail in a second embodiment of the present invention shown in FIG. 5.

Location information of a recording layer to which each writing speed is applied is recorded in another byte ($M^{th}$ or $(M+1)^{th}$ byte) within disc information to designate the number (offset) added in the $1^{st}$ disc information per writing speed. Namely, through the above-explained method, it is able to represent both of the location of the $1^{st}$ disc information per writing speed and the location of the recording layer applied per the corresponding writing speed, whereby the entire locations of sixteen disc informations can be represented by total 4-bytes.

In the application of the first embodiment of the present invention, the location information indicating a specific or one disc information is represented by simply allocating 1-byte to a reserved area within disc information. If there are sixteen disc informations, 16-bytes are needed. Hence, it is able to overcome the problem of extending future specifications in designating location informations of the entire disc informations.

FIG. 4B shows an example of representing location informations of sixteen disc informations according to the first embodiment of the present invention in case of four writing speeds and four different recording layers per writing speed, in which $3^{rd}$ and $4^{th}$ writing speeds are set to 4× speed and 6× speed, respectively.

In $N^{th}$ and $(N+1)^{th}$ bytes, a previously explained location of $1^{st}$ disc information per writing speed is represented by allocated 4-bits. '0000b' as upper 4-bits of the $N^{th}$ byte has a meaning of designating a location of $1^{st}$ disc information for 1× speed to become a disc information corresponding to a sequence number of '00h'. '0100b' as lower 4-bits of the $N^{th}$ byte has a meaning of designating a location of $1^{st}$ disc information for 2× speed to become a disc information corresponding to a sequence number of '04h'. '1000b' as upper 4-bits of the $(N+1)^{th}$ byte has a meaning of designating a location of $1^{st}$ disc information for 4× speed to become a disc information corresponding to a sequence number of '08h'. And, '1100b' as lower 4-bits of the $(N+1)^{th}$ byte has a meaning of designating a location of $1^{st}$ disc information for 6× speed to become a disc information corresponding to a sequence number of '12h'.

In $M^{th}$ and $(M+1)^{th}$ bytes, the information designating a location of a recording layer having each writing speed applied thereto is recorded. And, the embodiment of the present invention supports total four recording layers (Layer 0, Layer 1, Layer 2, and Layer 3). Hence, '0000b' as upper 4-bits of the $M^{th}$ byte designates a location of $1^{st}$ recording layer L0 per writing speed. '0001b' as lower 4-bits of the $M^{th}$ byte designates a location of $2^{nd}$ recording layer L1 per writing speed. '0010b' as upper 4-bits of the $(M+1)^{th}$ byte designates a location of $3^{rd}$ recording layer L2 per writing speed. And, '0011b' as lower 4-bits of the $(M+1)^{th}$ byte designates a location of $4^{th}$ recording layer L3 per writing speed.

In the above description, the recording layer information means a number (offset) added in each $1^{st}$ location information per writing speed. For instance, if the recording layer location information is '0000b' (L0), the number (offset) to be added is '0' so that the recording layer information means the corresponding $1^{st}$ disc information per writing speed. And, if the recording layer location information is '0010b' (L2), the number (offset) to be added is '2' so that the recording layer information means next $2^{nd}$ disc information in the corresponding $1^{st}$ disc information per writing speed.

In case a system intends to check 4× speed disc information of $3^{rd}$ recording layer, a location of $1^{st}$ disc information for 4× speed is checked from upper 4-bits of $(N+1)^{th}$ byte ('08h') and a location of a recording layer for the corresponding writing speed is then checked from upper 4-bits of $(M+1)^{th}$ byte. This results in the disc information coming in $3^{rd}$ position of $1^{st}$ disc information location for 4× speed ('08h'). Hence, the location of the disc information to be finally searched becomes the disc information having the sequence number of '11h'.

FIG. 4C shows an example of representing disc information location information according to the first embodiment of the present invention in FIG. 4A if total eight different disc informations exist in case of two recording layers and four different writing speed informations per recording layer. The detailed representing method is the same as described in FIG. 4B, thereby being skipped in the following description. Yet, the present embodiment relates to the case that there exist two recording layers only, whereby the $(M+1)^{th}$ byte having the information of $3^{rd}$ and $4^{th}$ recording layers is unnecessary to be set to '1111b'. If information of '1111b' is detected, a system recognizes that the corresponding recording layer fails to exist. It is apparent that the value of '1111b' can be replaced by another recognizable value as well.

Figure 5:
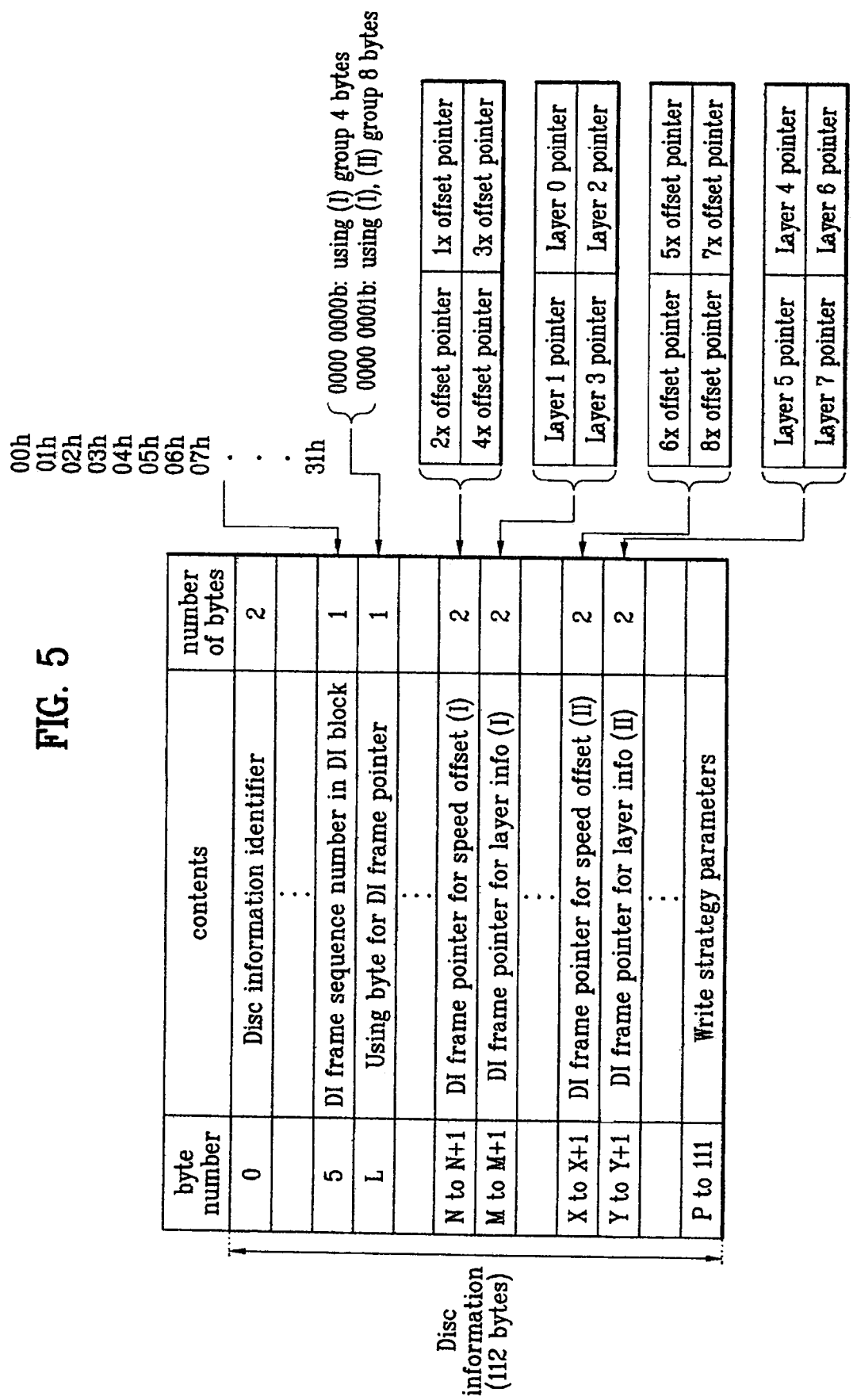
FIG. 5 is a diagram of disc information recorded according to a second embodiment of the present invention.

FIG. 5 is a diagram of disc information recorded according to a second embodiment of the present invention, which is applicable to a case that a concept of the first embodiment of the present invention in FIG. 4A is extended to add more writing speeds or recording layers.

Namely, the first embodiment of the present invention relates to a method of designating a location of disc information designating a maximum of four recording layers and a maximum of four different writing speeds per recording layer. If the number of the recording layers or writing speeds exceeds five, the first embodiment of the present invention becomes unable to represent them. Therefore, the second embodiment according to the present invention allocates more bytes to disc information to overcome such a problem. For convenience of explanation, a group of initial 4-bytes N, (N+1), M, and (M+1) is named $1^{st}$ group field and another group of additional 4-bits X, (X+1), Y, and (Y+1) is named $2^{nd}$ group field.

A recording method of the $2^{nd}$ group field, which is performed in the same manner of the $1^{st}$ group field, is decided by recording information designating a location of $1^{st}$ disc information per additional writing speed (offset pointers for $5^{th} \sim 8^{th}$ writing speeds written in $X^{th}$ and $(X+1)^{th}$ bytes) and information designating a location of disc information associated with additional recording layers having each writing speed applied thereto (Layer 4, 5, 6, and 7 pointers written in $Y^{th}$ and $(Y+1)^{th}$ bytes) in separate areas, respectively and by a combination of the recorded informations.

Information supporting presence or non-presence of using the $1^{st}$ and $2^{nd}$ group fields is recorded in a reserved area within disc information by 1-byte. For instance, by utilizing $L^{th}$ byte within disc information, the information is named 'using byte for DI frame pointer'. A main field is set to '0000 0000b' in case that location information of disc information is designated using the $1^{st}$ group field [$N^{th}$, $(N+1)^{th}$, $M^{th}$, and $(M+1)^{th}$ bytes] only. And, the main field is set to '0000 0001b' in case that location information of disc information is designated using both of the $1^{st}$ group field [$N^{th}$, $(N+1)^{th}$, $M^{th}$, and $(M+1)^{th}$ bytes] and the $2^{nd}$ group field [$X^{th}$, $(X+1)^{th}$, $Y^{th}$, and $(Y+1)^{th}$ bytes]. Hence, it is able to confirm the bytes (group field) for the currently used location information.

Accordingly, if each number of the writing speeds and the recording layers is equal to or smaller than 4, the $1^{st}$ group field is used only, the second group field is set to all 'zero', and '0000 0000b' is written in $L^{th}$ byte. In case any one of the writing speed number and the recording layer number needs at least five different informations, both of the $1^{st}$ and $2^{nd}$ group fields are utilized and '0000 0001b' is written in the $L^{th}$ byte.

FIGS. 6A to 6D are diagrams of disc information recorded according to a third embodiment of the present invention, in which intrinsic 'recording layer information' and 'writing speed information' are recorded within disc information as location information.

Figure 6A:
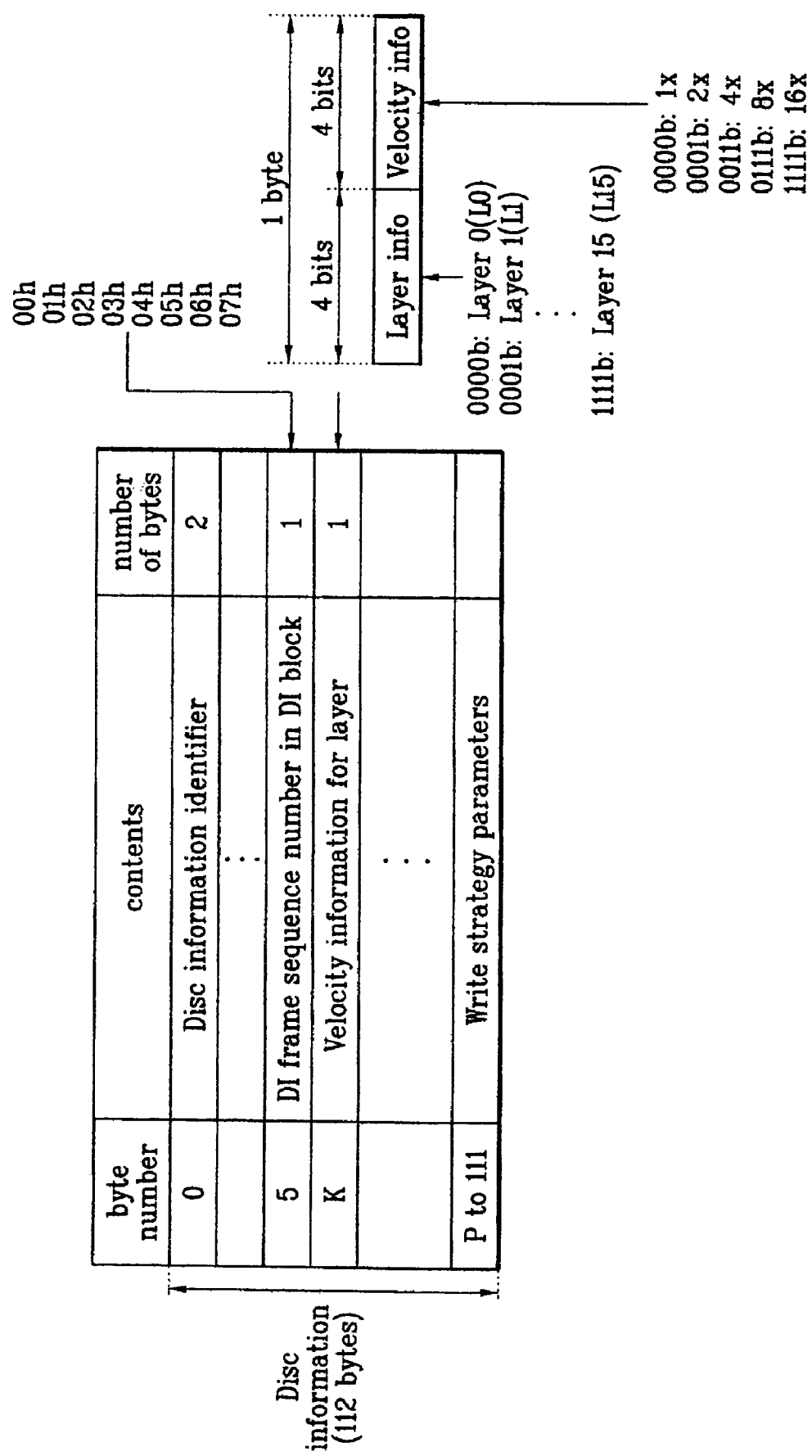
FIGS. 6A to 6D are diagrams of disc information recorded according to a third embodiment of the present invention.

Referring to FIG. 6A, a sequence for disc information each is decided by a sequence number and is recorded in 1-byte units. For instance, the information is recorded in the $5^{th}$ byte within disc information, is named 'DI frame sequence number in DI block', and is briefly represented by '00h, 01h, 02h, ...'. Namely, if the information of the $5^{th}$ byte is '00h', it means $1^{st}$ disc information. If the information of the $5^{th}$ byte is '07h', it means $8^{th}$ disc information. And, recording layer information and writing speed information, which are to be used by the corresponding disc information, are represented by specific bits to be recorded in a specific area ($K^{th}$ byte) within disc information.

For instance, recording layer information is recorded in upper 4-bits of the $K^{th}$ byte and writing speed information is recorded in lower 4-bits of the $K^{th}$ byte. And, the recording layer in formation can be defined as follows. If the recording layer information is '0000b', it means $1^{st}$ recording layer L0. If the recording layer information is '0001b', it means $2^{nd}$ recording layer L1. If the recording layer information is '1111b', it means $16^{th}$ recording layer L15.

And, the writing speed information can be variously defined. For instance, if the writing speed information is '0000b', it means 2× speed. If the writing speed information is '0111b', it means 8× speed. If the writing speed information is '1111b', it means 16× speed.

Hence, such a defining method of recording layer or writing speed information can be variously defined according to a system or via specification establishment. Besides, it is also possible to define the recording layer or writing speed information by allocating 1-byte thereto.

Hence, as shown in FIG. 4, intrinsic recording layer and writing speed informations corresponding to its sequence number are recorded in the previously specified specific location ($K^{th}$ byte), thereby facilitating to confirm recording layer and writing speed informations of the corresponding disc information. By recording write power or write parameters fitting the corresponding recording layer and writing speed in detail using the rest bytes within disc information such as $P^{th}$-$111^{th}$ bytes, it is able to enable efficient record and playback using these informations.

Figure 6B:
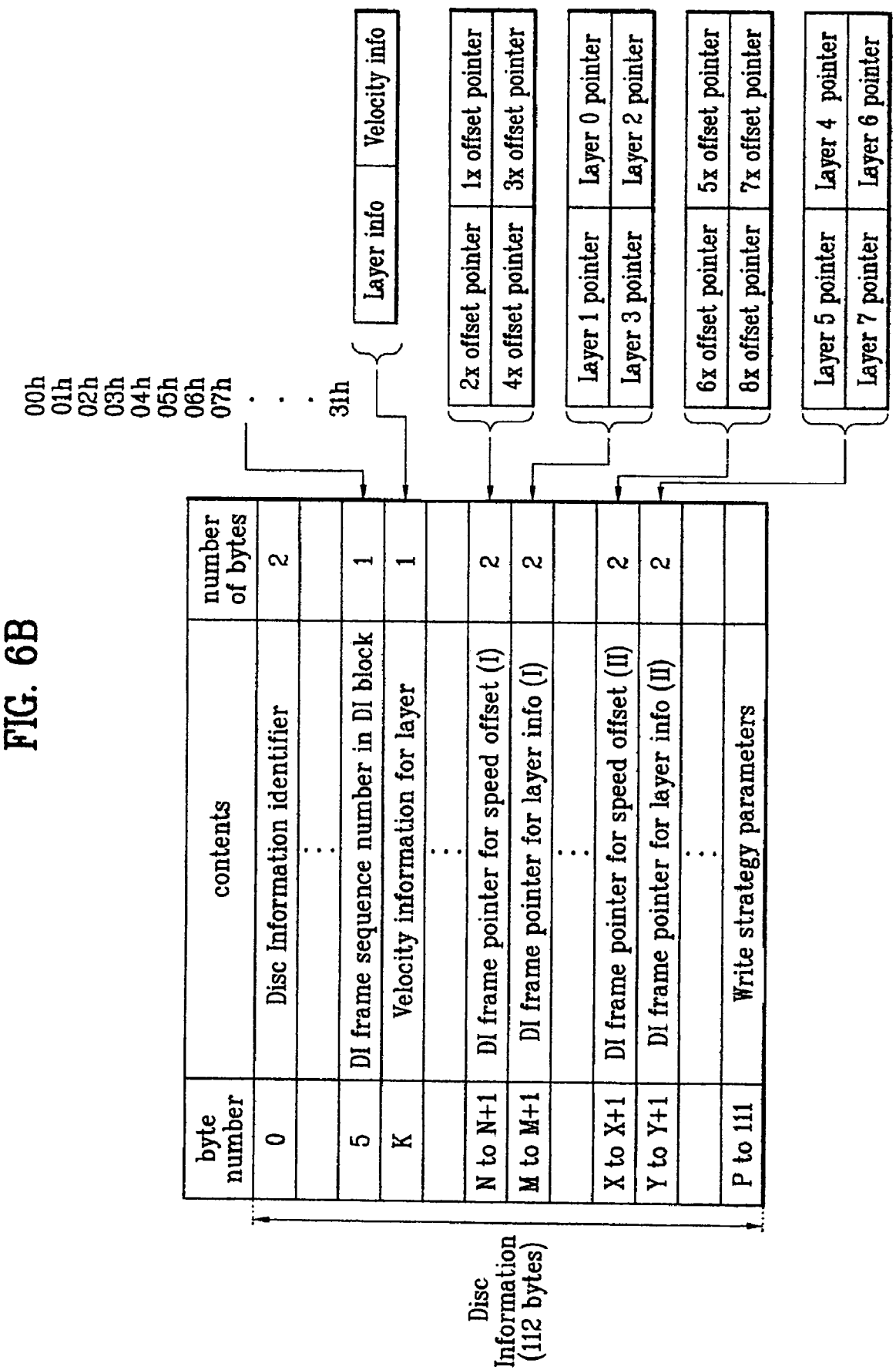

FIG. 6B shows an example of disc information recorded according to a third embodiment of the present invention, in which location information of disc information is represented by a combination of the first and second embodiments of the present invention.

First of all, disc information is very important information including writing speed information of a corresponding disc and a write strategy (WS) coping with a writing speed and requires high reliance. By recording disc information in a manner of implementing the third embodiment of the present invention together with both of the first and second embodiments of the present invention, it is facilitated to cope with error detection of the disc information just in case. Moreover, the methods according to the first and second embodiments of the present invention are recorded to enable to apply a specific embodiment of the present invention to designing a recording/reproducing apparatus (FIG. 8), thereby enabling to provide flexibility of implementation additionally.

Referring to FIG. 6B, intrinsic 'recording layer information' and 'writing speed information' of a corresponding disc information are recorded in $K^{th}$ byte within disc information. 'Pointer information' is recorded in $N^{th} \sim (N+1)^{th}$, $M^{th} \sim (M+1)^{th}$, $X^{th} \sim (X+1)^{th}$, and $Y^{th} \sim (Y+1)^{th}$ bytes in the same manner of the second embodiment of the present invention in FIG. 5. Locations of $1^{st}$ disc information per writing speed are recorded in the $N^{th} \sim (N+1)^{th}$ and $X^{th} \sim (X+1)^{th}$ bytes and applicable per recording layer information is recorded in the $M^{th} \sim (M+1)^{th}$ and $Y^{th} \sim (Y+1)^{th}$ bytes, which is performed in a manner of recording a number (offset) added in the location of the corresponding $1^{st}$ disc information per writing speed information. Besides, it is apparent that the $L^{th}$ byte used in the second embodiment of the present invention (FIG. 5) can be applied thereto.

Figure 6C:
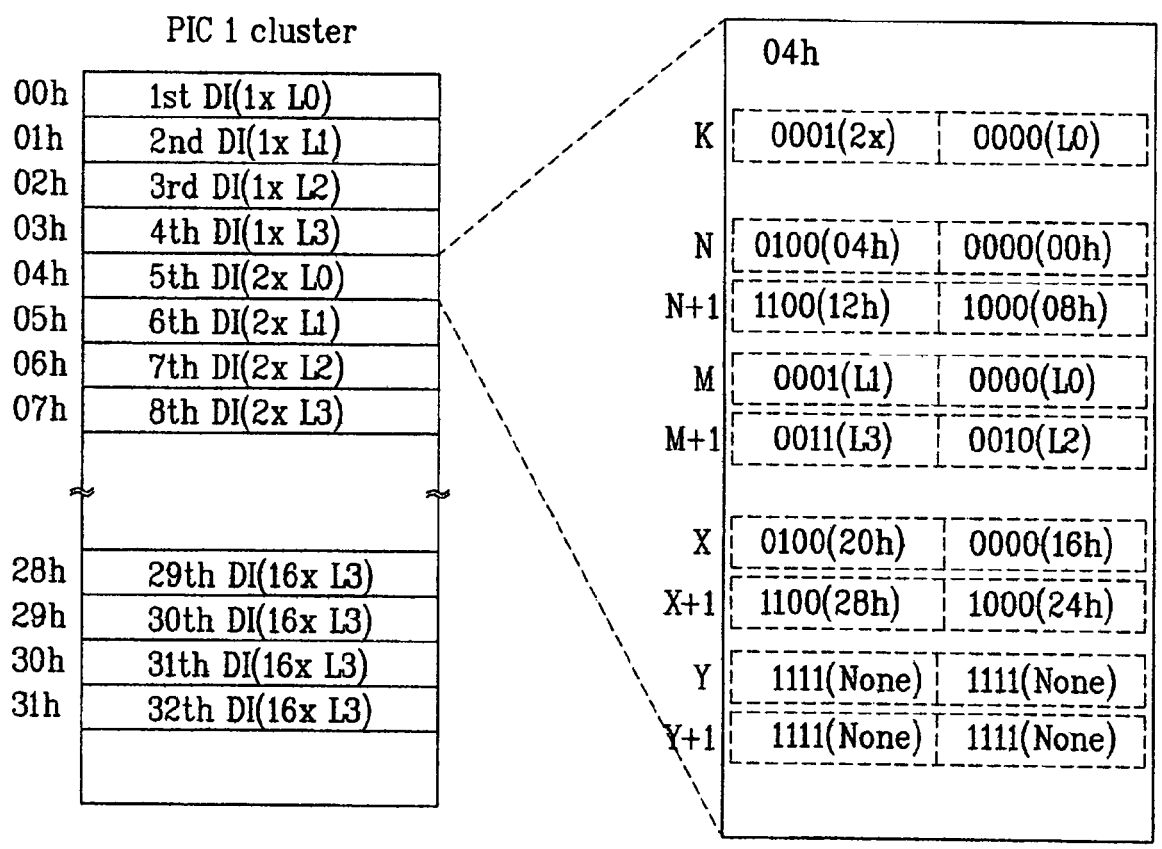

FIG. 6C shows an example of disc information using the example in FIG. 6B, in which total thirty-two disc informations associated with eight kinds of writing speeds and four recording layers exist within a disc. And, FIG. 6C specifically shows a sequence number '04h' as 5th disc information among the thirty-two disc informations.

In the disc information having the sequence number of '04h', common 'pointer information', as recorded in the entire disc informations, is recorded in $N^{th} \sim (N+1)^{th}$, $M^{th} \sim (M+1)^{th}$, $X^{th} \sim (X+1)^{th}$, and $Y^{th} \sim (Y+1)^{th}$ bytes. In case of the four recording layers of the present example, the $Y^{th} \sim (Y+1)^{th}$ bytes for representing additional recording layer(s) are not used and are set to '1111b' each.

In $K^{th}$ byte within the disc information having the sequence number of '04h', recording layer and writing speed informations meant by the corresponding disc information are recorded as intrinsic information of the corresponding disc information are recorded. Namely, as the disc information of '04h' is 2× speed associated disc information of $1^{st}$ recording layer, upper 4-bits of $7^{th}$ byte is '0000b' to indicate $1^{st}$ recording layer L0 and lower 4-bits thereof is '0001b' to directly record information indicating 2× speed.

Figure 8:
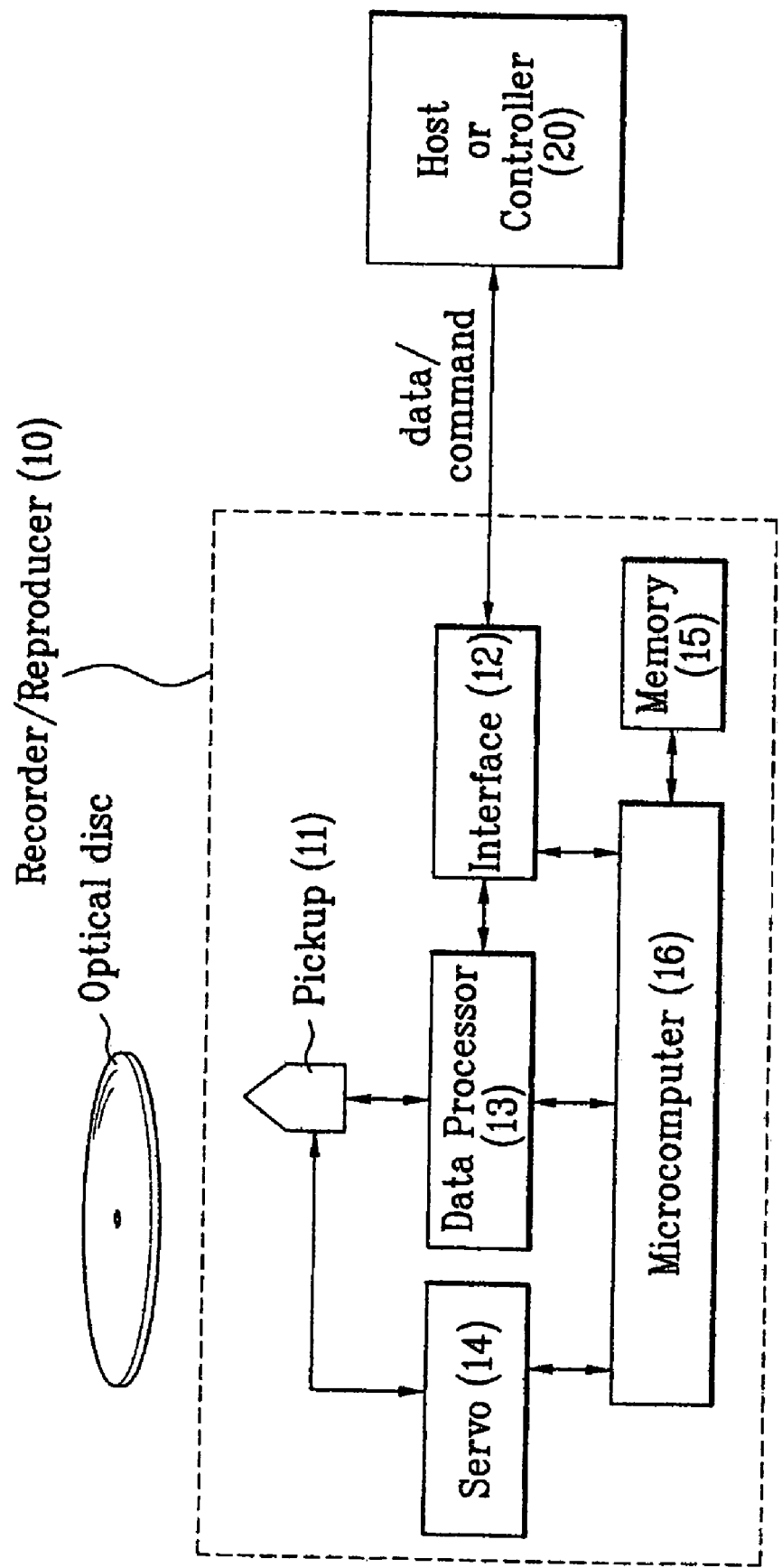
FIG. 8 is a block diagram of an optical disc recording/reproducing apparatus using disc information according to the present invention.

Hence, in case of intending to search '$1^{st}$ recording layer 2× speed disc information', a recording/reproducing apparatus in FIG. 8 preferentially reads out '0100 (04h)' of $N^{th}$ lower 4-bits as a '2× speed' pointer from 'pointer information', reads out '0000 (L0)' from $M^{th}$ upper 4-bits meaning '$1^{st}$ recording layer', and then adds it to the writing speed information ('0100 (04h)') to recognize that a location of final disc information associated with '$1^{st}$ recording layer 2× speed' is '04h'. And, the recording/reproducing apparatus in FIG. 8 enables to confirm or verify again that the corresponding disc information is related to '$1^{st}$ recording layer 2× speed' from $K^{th}$ byte within the '04h' disc information found from the 'pointer information'.

Figure 6D:
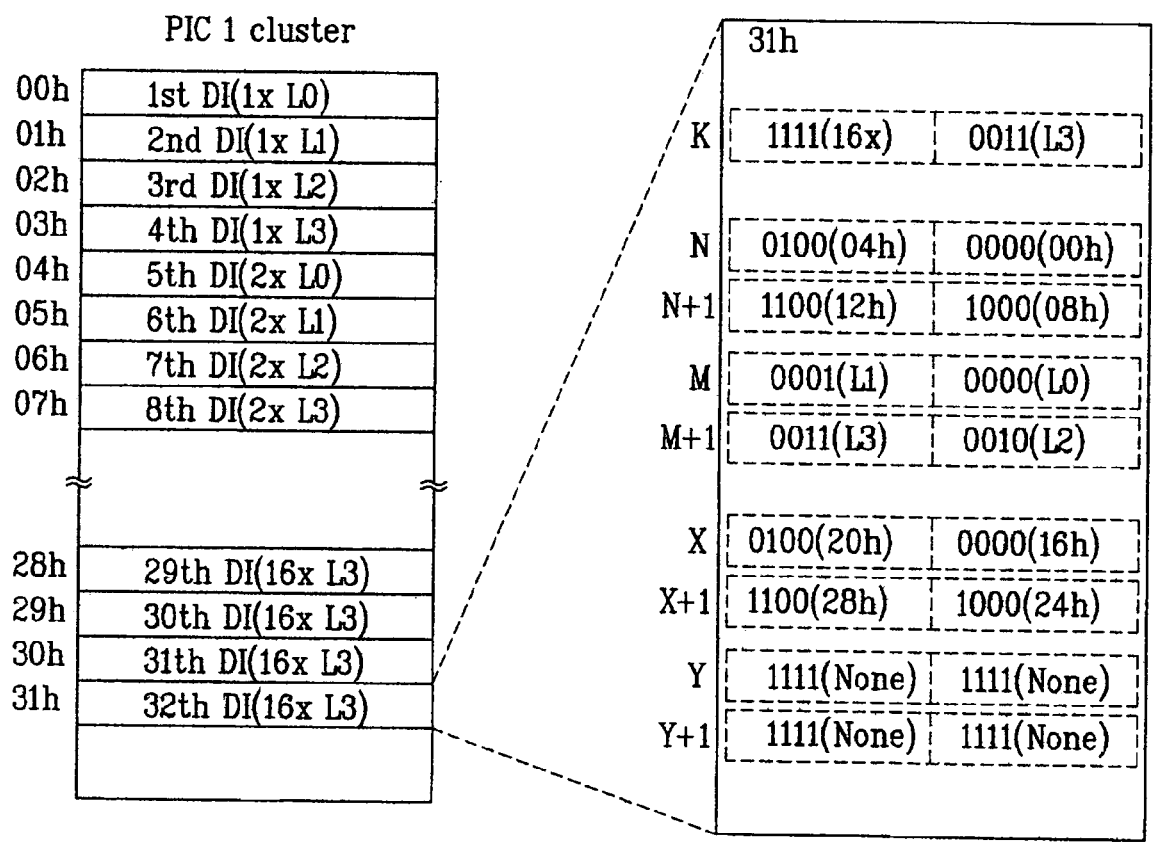

FIG. 6D shows an example of disc information using the example in FIG. 6B, in which total thirty-two disc informations associated with eight kinds of writing speeds and four recording layers exist within a disc. And, FIG. 6D specifically shows a last sequence number '31h' among the thirty-two disc informations.

The disc information having the sequence number of '31h' is arranged using the same 'pointer information' as in other disc informations for this embodiment. In $K^{th}$ byte within the disc information having the sequence number of '31h', recording layer information ('0011' meaning $3^{rd}$ recording layer) and writing speed information ('1111' meaning 16× speed), which are intrinsic to the '31h' disc information, are recorded.

Hence, in case of intending to search the '$3^{rd}$ recording layer 16× speed disc information', a recording/reproducing apparatus such as shown in FIG. 8 preferentially recognizes that the corresponding disc information is '31h' from 'pointer information' and then confirms or verifies that the corresponding disc information is related to '$3^{rd}$ recording layer 16× speed' from $K^{th}$ byte within the '31h' disc information, thereby enabling to detect correct disc information.

Figure 7A:
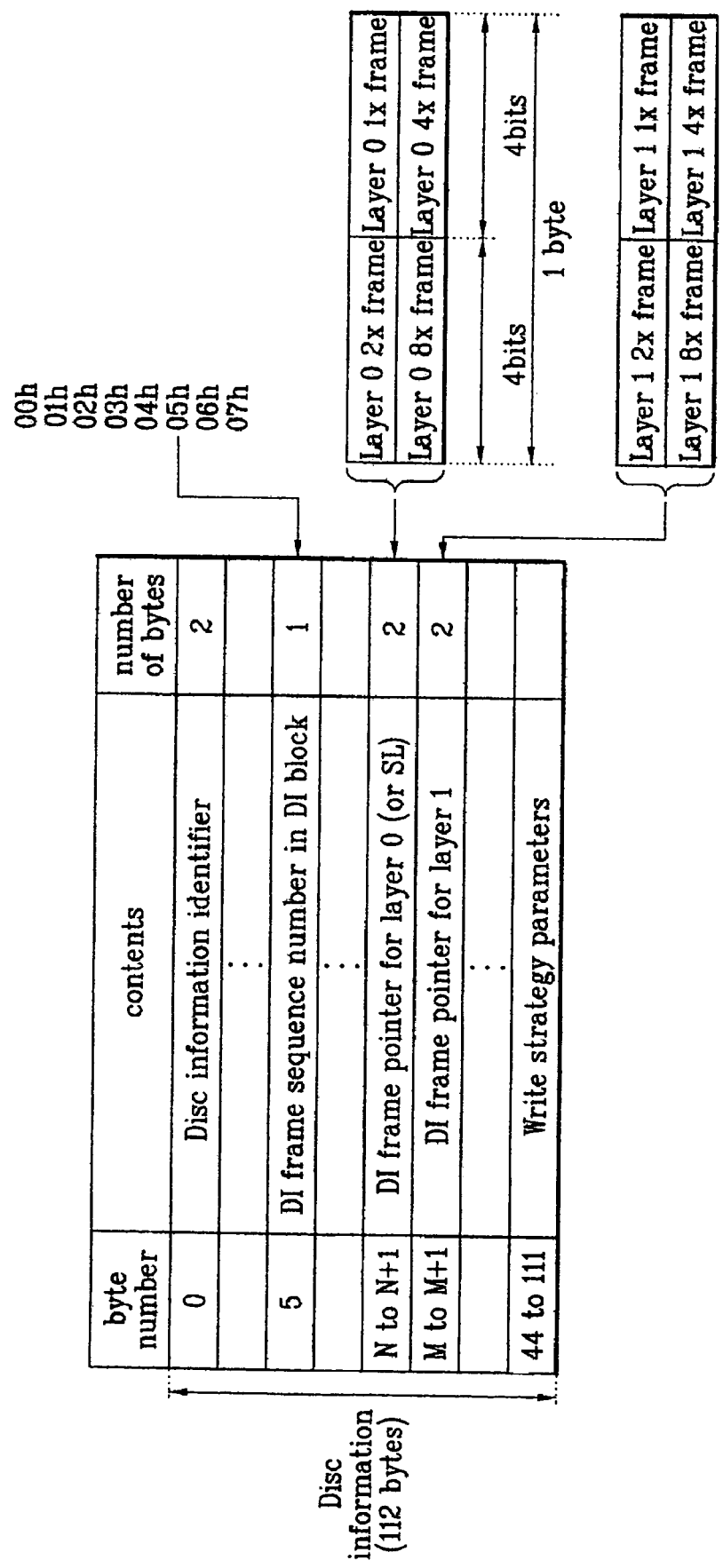

FIG. 7A and FIG. 7B are diagrams of disc control information recorded according to a fourth embodiment of present invention.

FIG. 7A shows a structure of disc information to explain a fourth embodiment according to the present invention.

Referring to FIG. 7A, a sequence for disc information each is decided by a sequence number and is recorded by 1-byte. For instance, the information is recorded in $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information. In order to recording location information of specific disc information, a fourth embodiment according to the present invention is characterized in that a specific recording layer is combined with a specific writing speed to indicate one location information.

Specifically, four writing speed informations for $1^{st}$ recording layer L0 are recorded in specific bytes N and (N+1) within disc information by allocating 4-bits to each of the four writing speed informations, and four writing speed informations for $2^{nd}$ recording layer L1 are recorded in specific bytes M and (M+1) within disc information by allocating 4-bits to each of the corresponding four writing speed informations. Namely, in the fourth embodiment of the present invention, a location of the corresponding disc information is directly designated by 4-bits, whereby location informations for eight disc informations can be represented by $N^{th}$, $(N+1)^{th}$, $M^{th}$, and $(M+1)^{th}$ bytes (total 4-bytes).

Such a method according to the fourth embodiment of the present invention, in which eight disc informations are designated by 4-bytes, is advantageous in that a location of disc information can be directly represented without combination of different informations despite having byte efficiency lower than that of the first or second embodiment of the present invention.

FIG. 7B shows an exemplary method of representing each location information of a total of 8 disc informations, in which two recording layers and four different writing speed informations per recording layer exist. Namely, information corresponding to a sequence of the corresponding disc information is recorded as location information in a location previously determined per recording layer and per writing speed in $N^{th}$, $(N+1)^{th}$, $M^{th}$, or $(M+1)^{th}$ byte within disc information.

In above embodiments, the pointer designating a location of disc control information per an applicable writing speed is considered at first, and then the pointer designating a location of information of an applicable recording layer is considered. Otherwise, the pointer designating a location of information of an applicable recording layer may be considered first if the disc control information is configured in order of disc control information for an applicable recording layer and applicable writing speed within the same recording layer.

Also, it is possible to search the related disc control information using DI frame sequence number of byte 5 if each disc control information includes an information indicating total applicable writing speed and total applicable recording layer. For example, if the applicable writing speed is four kinds of writing speeds, and the applicable recording layer includes two layers, total disc control information need sixteen of disc control information. If an disc control information to be searched is "second applicable writing speed and second recording layer", the related disc control information "03h" or "05h", depending on a first order per writing speed or per recording layer, may be searched using the DI frame sequence number because the DI frame sequence number is increased in ascending order from "00h".

FIG. 8 is a block diagram of a recording/reproducing apparatus of an optical disc according to the present invention.

Referring to FIG. 8, a recording/reproducing apparatus according to the present invention includes a recorder/reproducer 10 carrying out recording/reproducing on an optical disc and a control unit 20 controlling the recorder/reproducer 10.

The control unit 20 gives a record or playback command for a specific area, and the recorder/reproducer 10 caries out the recording/reproducing on the specific area according to the command of the control unit 20. Specifically, the recorder/reproducer 10 includes an interface unit 12 performing communications with an external device, a pickup unit 11 directly recording data on the optical disc or reproducing the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing management information including disc control information and data, and a microcomputer 16 responsible for controlling the above-described elements within the recorder/reproducer 10.

A disc information searching process of an optical disc according to the present invention is explained in detail as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing of the optical disc. Specifically, the management information stored in the memory 15 includes disc information of the present invention. Hence, the recording layer information, writing speed information, and write strategy fitting the corresponding writing speed recorded within the disc information are read out to be temporarily stored in the memory 15.

If intending to perform a recording on a specific area within the optical disc, the control unit 20 renders such an intent into a writing command and then delivers it to the recorder/reproducer 10 together with data for writing location information to be recorded. After receiving the writing command, the microcomputer 16 decides the corresponding writing speed applied to an intended recording layer within the optical disc from the management informations stored in the memory 15 and then performs the writing command using the optimal write strategy by referring to the decided writing speed.

In doing so, since location information of disc information is recorded within all disc information, the microcomputer enables to recognize locations informations of the entire disc informations by reading any one of the disc informations to facilitate to acquire the disc information associated with the requested writing speed information of the requested recording layer. Namely, in case that a plurality of disc informations exist, it is able to reduce a load of time taken for the memory to search the entire disc informations. Therefore, for the writing command of the control unit 20, the recorder/reproducer acquires the location-confirmed disc information whenever necessary, thereby enabling to perform the writing command at high speed using write strategy parameters recorded within the disc information.

Moreover, in case that the third embodiment of the present invention is additionally applied, it is advantageous in that the intrinsic recording layer and writing speed number of the corresponding disc information can be confirmed from the $K^{th}$ byte within the disc information.

Accordingly, the present invention provides various methods of providing disc control information coping with higher writing speed in a high-density optical disc, thereby enabling to uniformly apply the standardized disc control information to efficiently cope with the record/playback of the optical disc and to efficiently search a plurality of disc informations.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording control information on a recording medium, comprising:
   generating control information, the control information including at least one information unit associated with a writing speed and a recording layer, wherein the information unit includes a plurality of first pointers and a plurality of second pointers, each of the first pointers indicating a location of the information unit to be applicable to each of the writing speeds and/or each of the second pointers indicating a location of the information unit to be applicable to each of the recording layers, wherein the first pointers and the second pointers are classified into one or more pointer groups by predetermined number of the writing speeds and recording layers, and wherein the information unit further includes pointer information for indicating number of the pointer groups; and
   recording the control information in a specific area of the recording medium.

2. The method of claim 1, wherein the first pointer indicates a precedence of the corresponding information unit among the information units to be sequentially arranged per the writing speed.

3. The method of claim 1, wherein the first pointers and the second pointers are respectively recorded in all of the information units.

4. The method of claim 1, wherein a location of the information unit is determined based on the first and second pointers.

5. The method of claim 1, wherein the first pointer indicates a location of the preceding information unit among the information units if two or more information units are applicable to one of the writing speeds.

6. The method of claim 1, wherein the pointer information further indicates a pointer group to be available.

7. The method of claim 1, wherein the information unit further includes recording layer information for indicating at least one recording layer which the corresponding information unit applies to and writing speed information for indicating at least one writing speed which the corresponding information unit applies to, and wherein the recording layer information and the writing speed information are represented together within one byte information.

8. A recording medium having at least one recording layer, comprising:
- a recordable area for storing user data; and
- a prerecorded area for storing one or more information units being provided per recording layer and writing speed, wherein the information unit includes a plurality of first pointers and a plurality of second pointers, each of the first pointers indicating a location of the information unit to be applicable to each of the writing speeds and/or each of the second pointers indicating a location of the information unit to be applicable to each of the recording layers, wherein the first pointers and the second pointers are classified into one or more pointer groups by predetermined number of the writing speeds and recording layers, and wherein the information unit further includes pointer information for indicating number of the pointer groups.

9. The recording medium of claim 8, wherein the first pointer indicates a location of the preceding information unit among the information units if two or more information units are applicable to one of the writing speeds.

10. The recording medium of claim 8, wherein the pointer information further indicates a pointer group to be available.

11. The recording medium of claim 8, wherein the information unit further includes recording layer information for indicating at least one recording layer which the corresponding information unit applies to and writing speed information for indicating at least one writing speed which the corresponding information unit applies to, and wherein the recording layer information and the writing speed information are represented together within one byte information.

12. A method of recording data on a recording medium, comprising:
- reading control information from the recording medium, the control information including at least one information unit associated with a writing speed and a recording layer, wherein the information unit includes a plurality of first pointers and a plurality of second pointers, each of the first pointers indicating a location of the information unit to be applicable to each of the writing speeds and/or each of the second pointers indicating a location of the information unit to be applicable to each of the recording layers, wherein the first pointers and the second pointers are classified into one or more pointer groups by predetermined number of the writing speeds and recording layers, and wherein the information unit further includes pointer information for indicating number of the pointer groups; and
- recording data on a specific area of the recording medium based on the control information.

13. The method of claim 12, further comprising:
- identifying a location of the corresponding information unit for a requested writing speed based on the first pointer.

14. The method of claim 12, wherein the first pointer indicates a location of the preceding information unit among the information units if two or more information units are applicable to a requested writing speed.

15. The method of claim 12, further comprising:
- determining an available pointer group based on the pointer information.

16. An apparatus for recording data on and reproducing data from a recording medium, comprising:
- an optical pickup configured to read control information, the control information including at least one information unit associated with a writing speed and a recording layer, wherein the information unit includes a plurality of first pointers and a plurality of second pointers, each of the first pointers indicating a location of the information unit to be applicable to each of the writing speeds and/or each of the second pointers indicating a location of the information unit to be applicable to each of the recording layers, wherein the first pointers and the second pointers are classified into one or more pointer groups by predetermined number of the writing speeds and recording layers, and wherein the information unit further includes pointer information for indicating number of the pointer groups; and
- a controller operably connected with the optical pickup and configured to control the optical pickup to record data on the recording medium based on the control information.

17. The apparatus of claim 16, wherein the controller is configured to identify a location of the corresponding information unit for a requested writing speed based on the first pointer.

18. The apparatus of claim 17, wherein the controller is configured to identify a location of the preceding information unit among the information units if two or more information units are applicable to a requested writing speed.

19. The apparatus of claim 16, wherein the controller is configured to determine an available pointer group based on the pointer information.

* * * * *